US012563453B2

(12) United States Patent
Koskela et al.

(10) Patent No.: US 12,563,453 B2
(45) Date of Patent: Feb. 24, 2026

(54) BASE STATION AND USER EQUIPMENT

(71) Applicant: Nokia Technologies Oy, Espoo (FI)

(72) Inventors: Timo Koskela, Oulu (FI); Sami Hakola, Kempele (FI); Jorma Kaikkonen, Oulu (FI); Juha Karjalainen, Oulu (FI); Mihai Enescu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 403 days.

(21) Appl. No.: 17/798,953

(22) PCT Filed: Feb. 11, 2021

(86) PCT No.: PCT/IB2021/051147
§ 371 (c)(1),
(2) Date: Aug. 11, 2022

(87) PCT Pub. No.: WO2021/161224
PCT Pub. Date: Aug. 19, 2021

(65) Prior Publication Data
US 2023/0096338 A1     Mar. 30, 2023

(30) Foreign Application Priority Data
Feb. 13, 2020    (EP) .................................... 20157182

(51) Int. Cl.
*H04W 36/00*        (2009.01)
*H04L 5/00*         (2006.01)
(Continued)

(52) U.S. Cl.
CPC ....... *H04W 36/0016* (2013.01); *H04L 5/0091* (2013.01); *H04W 24/10* (2013.01); *H04W 72/231* (2023.01); *H04W 72/232* (2023.01)

(58) Field of Classification Search
None
See application file for complete search history.

(56) References Cited

U.S. PATENT DOCUMENTS

2019/0253949 A1    8/2019  Park et al. ...................... 36/305
2019/0261195 A1    8/2019  Cheng et al.
(Continued)

FOREIGN PATENT DOCUMENTS

CA        3099848 A1    11/2019
EP      3 609 285 A1     2/2020
(Continued)

OTHER PUBLICATIONS

"New WID: Further enhancements on MIMO for NR", 3GPP TSG RAN Meeting #86, RP-193133, Agenda: 9.1.1, Samsung, Dec. 9-12, 2019, 5 pages.
(Continued)

*Primary Examiner* — Benjamin Lamont
(74) *Attorney, Agent, or Firm* — ALSTON & BIRD LLP

(57)        ABSTRACT

A base station including at least one processor, and memory storing instructions that, when executed by the at least one processor, cause the base station at least to configure a user equipment, UE, with a bandwidth part associated with a non-serving cell, and with a reference signal associated with the bandwidth part, and to activate a transmission configuration indicator, ICI, state for PDCCH and/or PDSCH reception within the bandwidth part. The activated TCI state comprises quasi-co-located, QCL, information associated with the reference signal or with a further reference signal.

14 Claims, 10 Drawing Sheets

322 — Configure UE with UL BWP for non-serving Cell with Beam Failure Recovery Configuration 324 — Configure non-serving Cell as potential target Cell 326 — Preconfigure UE prior to triggering a L1- and/or L2- based handover for UE

(51) Int. Cl.
  *H04W 24/10*    (2009.01)
  *H04W 72/231*    (2023.01)
  *H04W 72/232*    (2023.01)

(56)          References Cited

U.S. PATENT DOCUMENTS

| | | | | |
|---|---|---|---|---|
| 2019/0261425 | A1* | 8/2019 | Park | H04W 76/27 |
| 2019/0297537 | A1 | 9/2019 | Tsai et al. | |
| 2020/0274679 | A1* | 8/2020 | Futaki | H04W 24/08 |
| 2020/0374725 | A1* | 11/2020 | Chen | H04L 5/0053 |
| 2021/0045115 | A1* | 2/2021 | Bai | H04W 72/51 |
| 2021/0091900 | A1* | 3/2021 | Zhang | H04L 5/0044 |
| 2021/0175937 | A1* | 6/2021 | Yamada | H04W 16/28 |
| 2021/0195452 | A1* | 6/2021 | Harada | H04W 56/001 |
| 2021/0376901 | A1* | 12/2021 | Cirik | H04B 7/0695 |

FOREIGN PATENT DOCUMENTS

| | | |
|---|---|---|
| JP | 2020005127 A | 1/2020 |
| WO | WO-2019/029597 A1 | 2/2019 |
| WO | WO 2019/223712 A1 | 11/2019 |

OTHER PUBLICATIONS

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

"3rd Generation Partnership Project; Technical Specification Group Radio Access Network; NR; Physical layer procedures for control (Release 16)", 3GPP TS 38.213, V16.0.0, Dec. 2019, pp. 1-146.

"Lower-layer mobility enhancements", 3GPP TSG-RAN WG1 Meeting #96, R1-1902528, Agenda: 7.2.12.1, Ericsson, Feb. 25-Mar. 1, 2019, pp. 1-8.

"Enhancements to enable inter-cell multi-TRP operations", 3GPP TSG RAN WG1 #102e, R1-2006845, Agenda: 8.1.2.2, Nokia, Aug. 17-28, 2020, 7 pages.

"3rd Generation Partnership Project; Technical Specification Group Services and System Aspects; Release 15 Description; Summary of Rel-15 Work Items (Release 15)", 3GPP TR 21.915, V15.0.0, Sep. 2019, pp. 1-118.

"3rd Generation Partnership Project; Technical Specification Group Radio Access Network; NR; Physical channels and modulation (Release 16)", 3GPP TS 38.211, V16.0.0, Dec. 2019, pp. 1-129.

"3rd Generation Partnership Project; Technical Specification Group Radio Access Network; NR; Medium Access Control (MAC) protocol specification (Release 15)", 3GPP TS 38.321, V15.8.0, Dec. 2019, pp. 1-78.

Extended European Search Report received for corresponding European Patent Application No. 20157182.5, dated Mar. 31, 2020, 9 pages.

Office Action received for corresponding Japanese Patent Application No. 2022-548397, dated Sep. 26, 2023, 6 pages of office action and 6 pages of translation available.

"Physical layer aspects for NR mobility enhancements", 3GPP TSG RAN WG1 Meeting #97, R1-1906056, Agenda: 7.2.12.1, Huawei, May 13-17, 2019, 12 pages.

"Enhancements to enable inter-cell multi-TRP operations", 3GPP TSG RAN WG1 #103-e, R1-2008905, Agenda: 8.1.2.2, Nokia, Oct. 26-Nov. 13, 2020, 5 pages.

Office action received for corresponding European Patent Application No. 20157182.5, dated Feb. 16, 2024, 8 pages.

Office Action received for corresponding Japanese Patent Application No. 2022-548397, dated Apr. 23, 2024, 4 pages of office action and 4 pages of summary and translation available.

Ericsson, "Lower-layer mobility enhancements", 3GPP TSG-RAN WG1 Meeting #99, R1-1912060, Reno, USA, Nov. 18-22, 2019.

Office Action for Chinese Application No. 202180014378.5 dated Feb. 24, 2025, 15 pages.

First Examination Report for Indian Application No. 202247051765 dated Nov. 25, 2022, 9 pages.

International Search Report and Written Opinion for Patent Cooperation Treaty Application No. PCT/IB2021/051147 date Mar. 3, 2021, 15 pages.

Office Action for European Application No. 20157182.5 dated Jul. 31, 2023, 8 pages.

Office Action for Indonesian Application No. P00202209670 dated Sep. 6, 2024, 4 pages.

Office Action for Vietnamese Application No. 1-2022-05751 dated Sep. 5, 2024, 4 pages.

Office Action for Chinese Application No. 202180014378.5 dated Oct. 25, 2025, 16 pages.

* cited by examiner

100

102 — Processor

104 — Memory

106 — Program

108 — Transceiver

Base Station

200

202 — Processor

204 — Memory

206 — Program

208 — Transceiver

User Equipment

1000

100 — Base Station

SRVC

N-SRVC

100' — further Base Station

200 — User Equipment

Fig. 4

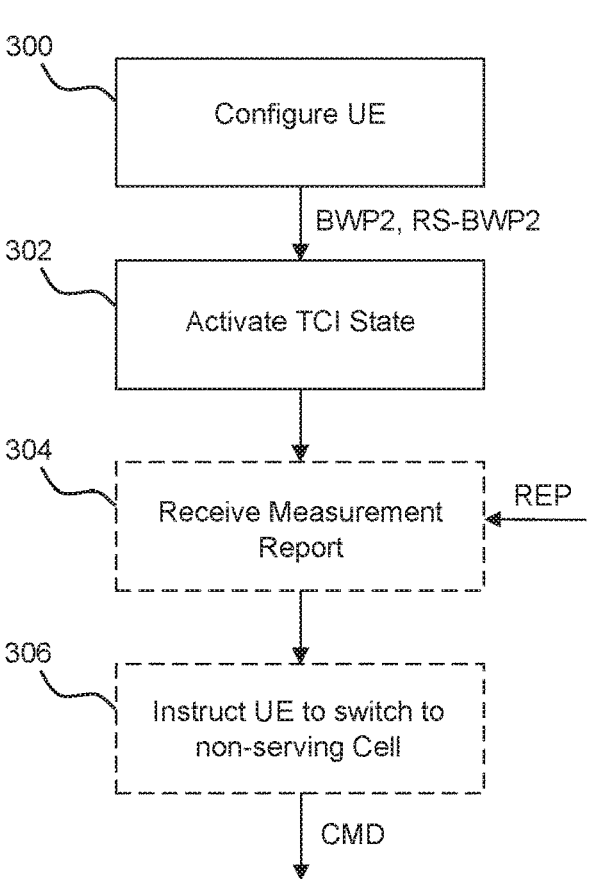

300 Configure UE

BWP2, RS-BWP2

302 Activate TCI State

304 Receive Measurement Report ← REP

306 Instruct UE to switch to non-serving Cell

CMD

Fig. 5

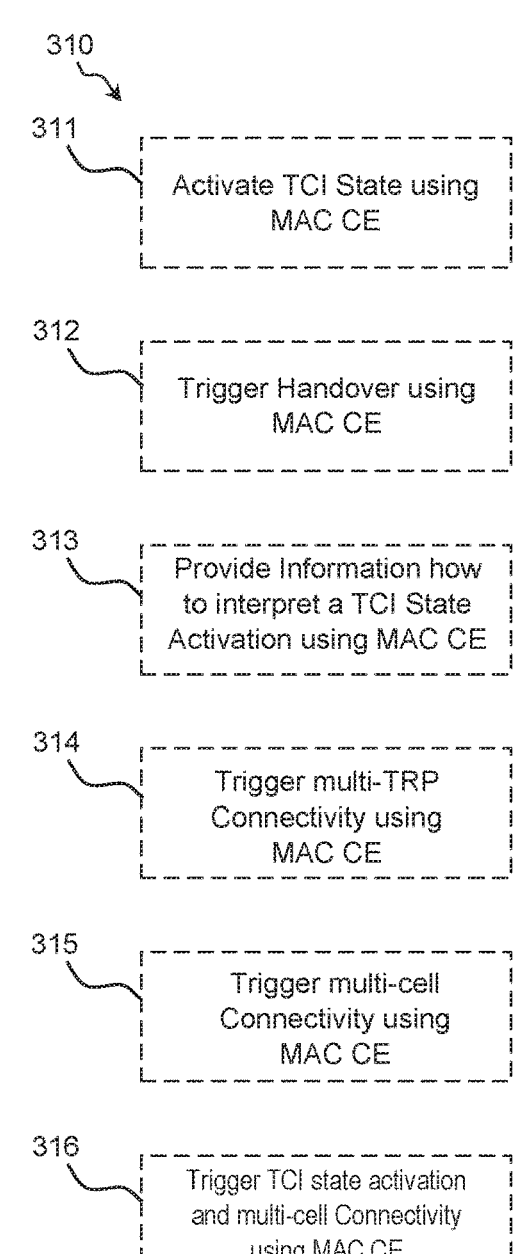

310

311 Activate TCI State using MAC CE

312 Trigger Handover using MAC CE

313 Provide Information how to interpret a TCI State Activation using MAC CE

314 Trigger multi-TRP Connectivity using MAC CE

315 Trigger multi-cell Connectivity using MAC CE

316 Trigger TCI state activation and multi-cell Connectivity using MAC CE

Fig. 6

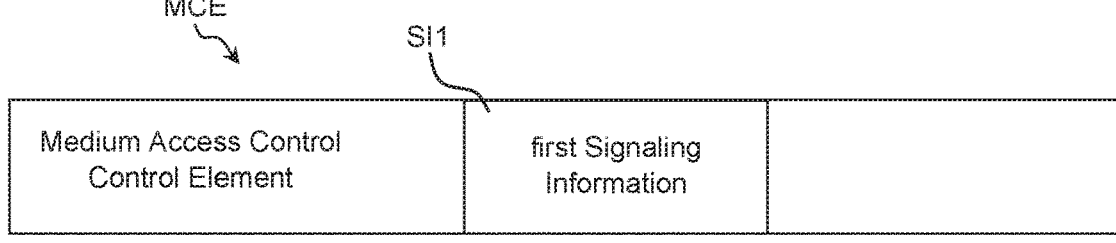

MCE

SI1

| Medium Access Control Control Element | first Signaling Information | |
|---|---|---|

Fig. 7

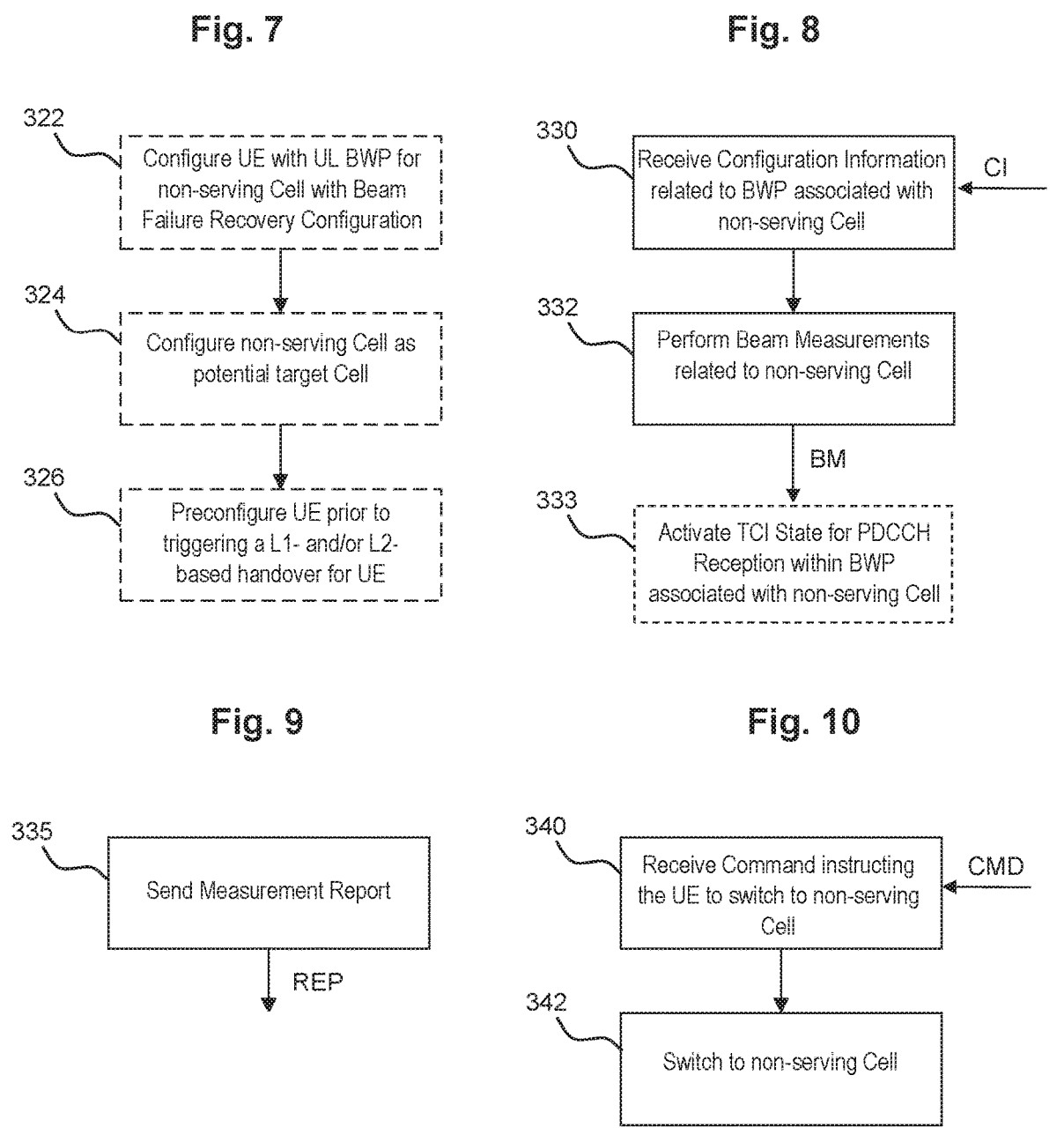

322 — Configure UE with UL BWP for non-serving Cell with Beam Failure Recovery Configuration 324 — Configure non-serving Cell as potential target Cell 326 — Preconfigure UE prior to triggering a L1- and/or L2-based handover for UE

Fig. 8

330 — Receive Configuration Information related to BWP associated with non-serving Cell ← CI 332 — Perform Beam Measurements related to non-serving Cell

BM

333 — Activate TCI State for PDCCH Reception within BWP associated with non-serving Cell

Fig. 9

335 — Send Measurement Report

REP

Fig. 10

340 — Receive Command instructing the UE to switch to non-serving Cell ← CMD

342 — Switch to non-serving Cell

350 — Receive RRC configuration information associated with non-serving Cell

352 — Trigger L1- and/or L2-based Handover

CE1

| Serving Cell ID | CORESET ID |
|---|---|
| CORE SET ID | TCI State ID |

CE2

| Serving Cell ID | CORESET ID |
|---|---|
| CORE SET ID | TCI State ID |
| HO  R  R  R  R  R  R  R | |

```
ServingCellConfig ::=              SEQUENCE {
  tdd-UL-DL-ConfigurationDedicated   TDD-UL-DL-ConfigDedicated                               OPTIONAL,  -- Cond TDD
  initialDownlinkBWP                 BWP-DownlinkDedicated                                   OPTIONAL,  -- Need M
  downlinkBWP-ToReleaseList          SEQUENCE (SIZE (1..maxNrofBWPs)) OF BWP-Id              OPTIONAL,  -- Need N
  downlinkBWP-ToAddModList           SEQUENCE (SIZE (1..maxNrofBWPs)) OF BWP-Downlink        OPTIONAL,  -- Need N
  firstActiveDownlinkBWP-Id          BWP-Id                                                  OPTIONAL,  -- Cond SyncAndCellAdd
  bwp-InactivityTimer                ENUMERATED {ms2, ms3, ms4, ms5, ms6, ms8, ms10, ms20, ms30,
                                                 ms40,ms50, ms60, ms80,ms100, ms200,ms300, ms500,
                                                 ms750, ms1280, ms1920, ms2560, spare10, spare9, spare8,
                                                 spare7, spare6, spare5, spare4, spare3, spare2, spare1 } defaultDownlinkBWP-Id              BWP-Id                                                  OPTIONAL,  --Need R
  uplinkConfig                       UplinkConfig                                            OPTIONAL,  -- Need S
  supplementaryUplink                UplinkConfig                                            OPTIONAL,  -- Need M
  pdcch-ServingCellConfig            SetupRelease { PDCCH-ServingCellConfig }                OPTIONAL,  -- Need M
  pdsch-ServingCellConfig            SetupRelease { PDSCH-ServingCellConfig }                OPTIONAL,  -- Need M
  csi-MeasConfig                     SetupRelease { CSI-MeasConfig }                         OPTIONAL,  -- Need M
  sCellDeactivationTimer             ENUMERATED {ms20, ms40, ms80, ms160, ms200, ms240,
                                                 ms320, ms400, ms480, ms520, ms640, ms720,
                                                 ms840, ms1280, spare2,spare1}                OPTIONAL,  -- Cond ServingCellWithoutPUCCH crossCarrierSchedulingConfig       CrossCarrierSchedulingConfig                            OPTIONAL,  -- Need M
  tag-Id                             TAG-Id,
  dummy                              ENUMERATED {enabled}                                    OPTIONAL,  -- Need R
  pathlossReferenceLinking           ENUMERATED {spCell, sCell}                              OPTIONAL,  -- Cond SCellOnly
  servingCellMO                      MeasObjectId                                            OPTIONAL,  -- Cond MeasObject
```
| Non-serving Cell    PhysCellId               OPTIONAL,    R1 |

```
  ...,
  [[
  lte-CRS-ToMatchAround              SetupRelease { RateMatchPatternLTE-CRS }                               OPTIONAL,  -- Need M
  rateMatchPatternToAddModList       SEQUENCE (SIZE (1..maxNrofRateMatchPatterns)) OF RateMatchPattern     OPTIONAL,  -- Need N
  rateMatchPatternToReleaseList      SEQUENCE (SIZE (1..maxNrofRateMatchPatterns)) OF RateMatchPatternId   OPTIONAL,  -- Need N
  downlinkChannelBW-PerSCS-List      SEQUENCE (SIZE (1..maxSCSs)) OF SCS-SpecificCarrier                   OPTIONAL,  -- Need S
  ]]
```

Fig. 18

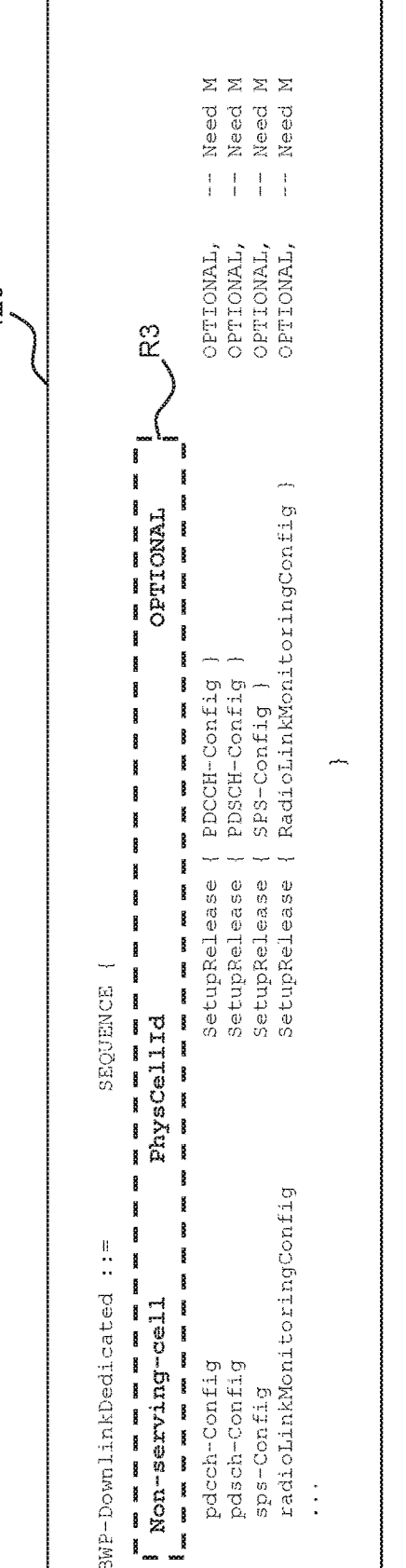

```
BWP-DownlinkDedicated ::=          SEQUENCE {
| Non-serving-cell    PhysCellId                         OPTIONAL          R3
pdcch-Config              SetupRelease { PDCCH-Config }         OPTIONAL,      -- Need M
pdsch-Config              SetupRelease { PDSCH-Config }         OPTIONAL,      -- Need M
sps-Config                SetupRelease { SPS-Config }           OPTIONAL,      -- Need M
radioLinkMonitoringConfig SetupRelease { RadioLinkMonitoringConfig }  OPTIONAL,  -- Need M
...
}
```

```
BWP-Downlink ::=          SEQUENCE {
| Non-serving-cell    PhysCellId                         OPTIONAL          R2
bwp-Id            BWP-Id,
bwp-Common        BWP-DownlinkCommon                OPTIONAL,      -- Cond SetupOtherBWP
bwp-Dedicated     BWP-DownlinkDedicated             OPTIONAL,      -- Cond SetupOtherBWP
...
}
```

IE2

BASE STATION AND USER EQUIPMENT

CROSS REFERENCE TO RELATED APPLICATION

This patent application is a U.S. National Stage application of International Patent Application Number PCT/IB2021/051147 filed Feb. 11, 2021, which is hereby incorporated by reference in its entirety, and claims priority to EP 20157182.5 filed Feb. 13, 2020.

SPECIFICATION

Field of the Disclosure

Exemplary embodiments relate to a base station.

Further exemplary embodiments relate to a user equipment.

Further exemplary embodiments relate to a method of operating a base station.

Further exemplary embodiments relate to a method of operating a user equipment.

Background

Base stations may e.g. be used in wireless communications networks, e.g. to provide one or more radio cells for serving user equipment.

In the context of 3rd Generation Partnership Project, 3GPP, new radio, NR, development, RAN#86 agreed on a new Work Item for further enhancements related to beam management for multiple input multiple output, MIMO, for NR.

Beam Management is a set of functionalities to assist user equipment, UE, to set its receive, RX, and transmit, TX, beams for downlink, DL, receptions and uplink, UL, transmissions, respectively within one or more currently serving cells.

The functionalities can be categorized roughly to four categories:

1. Beam Indication (Assist UE to set its RX and TX beam properly for the reception of DL and transmission of UL, respectively);
2. Beam Acquisition, Measurements and Reporting (Procedures for providing gNB knowledge about feasible DL and UL beams for the UE);
3. Beam Recovery (For rapid link reconfiguration against sudden blockages, i.e. fast re-aligning of gNB and UE beams); and
4. Beam Tracking and Refinement (Set of procedures to refine gNB and UE side beams).

SUMMARY

The scope of protection sought for various embodiments of the disclosure is set out by the independent claims. The exemplary embodiments and features, if any, described in this specification, that do not fall under the scope of the independent claims, are to be interpreted as examples useful for understanding various exemplary embodiments of the disclosure.

Exemplary embodiments relate to a base station comprising at least one processor, and memory storing instructions that, when executed by the at least one processor, cause the base station at least to configure a user equipment, UE, with a bandwidth part associated with a non-serving cell, and with a reference signal associated with the bandwidth part which the UE can use to perform beam measurements related to the non-serving cell.

This enables the UE to determine information related to one or more beams of a currently non-serving cell, e.g. operated by a neighboring base station.

According to further exemplary embodiments, the information, i.e. in form of the beam measurements, may e.g. be used to prepare a handover procedure and/or to determine whether a handover procedure should be prepared.

According to further exemplary embodiments, the base station may e.g. be used for wireless, particularly cellular, communications systems such as of the 5G/NR (fifth generation new radio) type. Particularly, exemplary embodiments may e.g. be used for enhancing existing procedures of 5G Release 15, cf. e.g. 3GPP TR 21.915 V15.0.0 (2019-09), thus e.g. enhancing a conventional gNodeB (gNB).

A bandwidth part ("BWP") is a contiguous set of common resource blocks of a given numerology on a given carrier, see, for example, 3GPP TS 38.211 V 15.8.0 (2019-12), section 4.4.5.

A UE may be configured to operate using BWPs and may e.g. be configured with a carrier BWP that defines the UE's operating bandwidth within a cell's operating bandwidth. For initial access, the UE may detect an initial BWP in a system information to be used until the UE's configuration in a cell is received. A UE may be configured with up to four BWPs for DL (downlink) reception and up to four BWPs for UL (uplink) transmission, of which, only one can be active on a given component carrier for each direction, DL and UL.

According to further exemplary embodiments, the instructions, when executed by the at least one processor, further cause the base station to activate a transmission configuration indicator, TCI, state for PDCCH reception within the bandwidth part, and wherein the activated TCI state comprises quasi-co-located, QCL, information associated with the reference signal or with a further reference signal.

According to further exemplary embodiments, the activating of the TCI state may comprise activating the TCI state for a physical downlink control channel, PDCCH, with reference to a control resource set, CORESET, identifier (CORESET ID), which is specific for the bandwidth part.

According to further exemplary embodiments, the activating of the TCI state may comprise activating the TCI state for a physical downlink shared channel, PDSCH, with reference to a bandwidth part identifier, BWP ID.

According to further exemplary embodiments, the instructions, when executed by the at least one processor, further cause the base station to receive at least one measurement report from the UE comprising information characterizing the beam measurements related to the non-serving cell.

According to further exemplary embodiments, the instructions, when executed by the at least one processor, further cause the base station to instruct the UE via at least one of L1 signaling or L2 signaling to switch to the non-serving cell. In one example, instructing the UE to switch to the non-serving cell is preferably based on the measurement report. This enables to efficiently initiate and/or perform fast handover procedures using L1/L2 signaling.

According to further exemplary embodiments, physical layer (L1) signaling may be used for the instructing, e.g. using downlink control information, DCI.

According to further exemplary embodiments, medium access control (MAC) (L2) signaling may be used for the instructing, e.g. using at least one MAC control element, CE, (MAC CE).

According to further exemplary embodiments, the instructions, when executed by the at least one processor, further cause the base station to use a medium access control, MAC, control element (MAC CE), for at least one of: a) activating a TCI state, including the TCI state for PDCCH reception within the bandwidth part associated with the non-serving cell, b) triggering a handover of the UE to the non-serving cell, c) providing first signaling information (e.g., a one-bit-field) which indicates whether the UE should interpret a TCI state activation as a trigger for a handover, d) triggering the UE to enter multi-transmission and reception point, multi-TRP, connectivity with its currently serving cell and the non-serving cell, e) triggering multi-cell connectivity for a currently activated TCI state, f) triggering both a TCI state activation and multi-cell connectivity.

According to further exemplary embodiments, the at least one bandwidth part associated with the non-serving cell comprises: at least one downlink bandwidth part of the non-serving cell and/or at least one uplink bandwidth part of the non-serving cell.

According to further exemplary embodiments, further signaling information may be provided which e.g. indicates that the network or base station only updates a TCI state for PDCCH, i.e. the state is active but the UE is not supposed to monitor PDCCH, e.g. until HO is triggered or until the BWP is activated for the UE. In one example the activation of the BWP associated with the non-serving cell may trigger the UE to perform handover to the non-serving cell.

In another example the TCI state for the BWP associated with the non-serving cell (or for the CORESET of the BWP in case of PDCCH) may be activated but the UE is not monitoring PDCCH/receiving PDSCH until the BWP is activated by means of e.g. L1 and/or L2 signalling, or due to an event. In one example, an event may be one of a) beam failure on a serving cell, b) a radio link failure on a serving cell, c) a radio link problem on a serving cell, d) a conditional handover (CHO), e) a beam failure recovery to the non-serving cell.

According to further exemplary embodiments, in any of the signalling/configuration/activation/triggering examples herein the signalling is not limited to only L1 (e.g. DCI), L2 (e.g. MAC CE), but L3 signalling (e.g. RRC) may be used as well.

In one example, using the L1 and/or L2 signaling to activate specific parts of the configuration may refer to activation of beam measurement and/or reporting configuration. This configuration can be e.g. periodic, semi-persistent or aperiodic reporting.

According to further exemplary embodiments, the MAC CE can be used to trigger HO without activating new TCI state, or it can be used to activate a new TCI state and trigger HO.

According to further exemplary embodiments, the MAC CE can be used to indicate whether a TCI state is activated, and connectivity is established with the neighbor cell without HO, i.e. the current serving cell connection is maintained and the UE may enter in multi-TRP connectivity with the serving cell and at least one TRP of at least one neighbor cell.

According to further exemplary embodiments, for signaling the information referred to in the preceding paragraphs, the first signaling information and/or further (i.e., additional) signaling information may be provided, e.g. in the form of one or more bit fields.

According to further exemplary embodiments, the instructions, when executed by the at least one processor, further cause the base station to configure the UE with an uplink bandwidth part for the non-serving cell that includes a beam failure recovery configuration.

According to further exemplary embodiments, the instructions, when executed by the at least one processor, further cause the base station to configure the non-serving cell by means of radio resource control, RRC, configuration information as a potential target cell prior to triggering a L1- and/or L2-based handover for the UE.

According to further exemplary embodiments, said RRC configuration information may comprise an information field indicating that said non-serving cell is a potential target cell for inter-cell multi-TRP connectivity.

According to further exemplary embodiments, an existing RRC signaling message may be extended by adding the information field indicating that the non-serving cell is a potential handover target cell for a L1- and/or L2-triggered handover.

According to further exemplary embodiments, the instructions, when executed by the at least one processor, further cause the base station to preconfigure the UE by means of RRC configuration information associated with the non-serving cell prior to triggering a L1- and/or L2-based handover for the UE.

According to further exemplary embodiments, a functionality of the base station may be implemented within, i.e. distributed over, different physical entities or devices, respectively. As an example, according to further exemplary embodiments, a first device may e.g. configure a UE with at least one bandwidth part associated with a non-serving cell, whereas a second device may e.g. instruct the UE to perform at least one beam measurement related to the at least one bandwidth part associated with the non-serving cell.

Further exemplary embodiments relate to a user equipment, UE, comprising at least one processor, and memory storing instructions that, when executed by said at least one processor, cause the UE at least to receive configuration information related to a bandwidth part associated with a non-serving cell and to a reference signal associated with the bandwidth part, and to perform beam measurements related to the non-serving cell by means of the reference signal.

According to further exemplary embodiments, the receiving of the configuration information may be performed via at least one of L1 signaling and L2 signaling.

According to further exemplary embodiments, the UE may e.g. be used for wireless, particularly cellular, communications systems such as of the 5G/NR (fifth generation new radio) type. Particularly, exemplary embodiments may e.g. be used for enhancing existing procedures of 5G Release 15, cf. e.g. 3GPP TR 21.915 V15.0.0 (2019-09).

According to further exemplary embodiments, the instructions, when executed by the at least one processor, further cause the UE to activate a transmission configuration indicator, TCI, state for PDCCH reception within the bandwidth part, wherein the activated TCI state comprises quasi-co-located, QCL, information associated with the reference signal or with a further reference signal.

In one example, the UE may be instructed to perform L1 beam measurements and L1/L2 reporting of the measurements of the non-serving cell using RRC signaling (L3) of the non-serving cell. The non-serving cell RRC signaling may be provided to UE via the serving cell RRC signaling or included as a part of the serving cell signaling.

According to further exemplary embodiments, the instructions, when executed by the at least one processor, further cause the UE to send a measurement report comprising information characterizing the beam measurements related to the non-serving cell, to a base station operating a currently serving cell.

According to further exemplary embodiments, the instructions, when executed by the at least one processor, further cause the UE to receive a command instructing the UE to switch to the non-serving cell via at least one of L1 signaling or L2 signaling, and to switch to the non-serving cell in response to the command. According to further exemplary embodiments, the currently serving base station of the UE may instruct the UE to switch to the non-serving cell via the at least one of L1 signaling or L2 signaling.

According to further exemplary embodiments, the instructions, when executed by the at least one processor, further cause the UE to determine that the bandwidth part is associated with the non-serving cell based on a physical cell ID, PCI, field included in the configuration information. In other words, according to further exemplary embodiments, if the PCI field is present in the configuration information (and/or an RRC information element or in any configuration associated with the BWP), the UE may interpret the related bandwidth part configuration as a configuration related to a non-serving cell.

In an alternative example, the determination may be based on any identifier that identifies that the configured BWP is not for the current serving cell, i.e. is not considered as serving cell BWP configuration. In yet one alternative example, part of the BWP configuration e.g. any sub information element of the BWP configuration (e.g. PDCCH-config) may include identifier (such as PCI) to identify the BWP to be non-serving cell BWP.

According to further exemplary embodiments, in these cases, only specific functions may be active and/or functional and/or required to perform at the UE. As an example, if the UE interprets the related bandwidth part configuration as a configuration related to a non-serving cell, it may not monitor (or may not be required to monitor) a physical downlink control channel, PDCCH, but rather (for example only) perform beam measurements and/or reporting, particularly according to the configuration.

In one example, the measurement configuration may be part of the non-serving cell configuration and the reporting part of the configuration may be part of the serving cell configuration.

In one example the reporting configuration may refer to a specific measurement configuration, e.g. a list of DL reference signals associated with the non-serving cell bandwidth part.

In yet another example, when the UE is configured with a non-serving cell BWP, the measurement configuration and associated reporting may be configured on using the serving cell signaling but the measurement and reporting configuration are associated with the non-serving cell BWP.

According to further exemplary embodiments, a network side entity, e.g. the base station, may active TCI states and/or update a TCI state list for the respective bandwidth part.

A TCI state list may be included in the bandwidth part configuration (e.g. the BWP configuration may include the PDCCH configuration including CORESET configuration for PDCCH reception that further includes the TCI state list configuration) of the non-serving cell BWP or it may be included in the BWP configuration of the serving cell.

A TCI state list of another BWP such as non-serving cell BWP may be identified based on an identifier that indicates that the TCI state list is not for the serving cell BWP (or for a currently active BWP of the serving cell but is for the BWP of the non-serving cell).

According to further exemplary embodiments, the configuration information are related to an uplink bandwidth part associated with the non-serving cell and include a beam failure recovery configuration. In the event of beam failure on the serving cell, the UE may determine to trigger a beam failure recovery procedure to the non-serving cell using the provided configuration. The beam failure recovery configuration may contain a configuration of contention free random access (CFRA) resources that are associated with downlink reference signals (L3CSI-RS, SSB, NZP-CSI-RS for beam management) of the non-serving cell.

According to further exemplary embodiments, the instructions, when executed by the at least one processor, further cause the UE to receive RRC configuration information associated with the non-serving cell prior to triggering a L1- and/or L2-based handover for the UE.

According to further exemplary embodiments, the instructions, when executed by the at least one processor, further cause the UE to determine which reference signal is quasi-co-located with a physical downlink control channel, PDCCH, of the non-serving cell.

Further exemplary embodiments relate to a system comprising at least one base station according to the embodiments and at least one UE according to the embodiments. According to further exemplary embodiments, the system may comprise one or more further base stations and/or one or more further UE. According to further exemplary embodiments, the at least one further base station may be a conventional base station or a (further) base station according to the embodiments.

Similarly, according to further exemplary embodiments, the at least one further UE may be a conventional UE or a (further) UE according to the embodiments.

Further exemplary embodiments relate to a method of operating a base station, e.g. a gNodeB, comprising: configuring a UE with a bandwidth part associated with a non-serving cell, and with a reference signal associated with the bandwidth part which the UE can use to perform beam measurements related to the non-serving cell.

According to further exemplary embodiments, the base station may be configured to instruct the UE to perform the reporting of measurements particularly using at least one of layer 1, L1, signaling or layer 2, L2, signaling. According to further exemplary embodiments, the network, i.e. base station may provide the UE with non-serving cell configuration (such as BWP configuration) using RRC signaling, and it may activate specific functions of the RRC configuration using either L1 signaling such as DCI, and/or L2 signaling such as MAC CE, or it may activate specific functions using L3 signaling. One example of the specific function may be beam measurements and/or beam reporting configuration. The configuration may comprise of measuring and/or reporting non-serving cell beams. Reporting of the measurements may be performed using L1 reporting such as PUCCH/PUSCH or L2 reporting such as MAC CE.

Further exemplary embodiments relate to a method of operating a UE, comprising: receiving configuration information related to a bandwidth part associated with a non-serving cell, and to a reference signal associated with the bandwidth part, and performing beam measurements related to the non-serving cell by means of the reference signal.

Further exemplary embodiments relate to a computer program and/or computer program product comprising instructions which, when the program is executed by a computer, cause the computer to carry out method according to the embodiments.

Further exemplary embodiments relate to a data carrier signal carrying and/or characterizing the computer program according to the embodiments.

Further exemplary embodiments relate to a use of the base station according to the embodiments and/or of the UE according to the embodiments and/or of the method according to the embodiments and/or of the system according to the embodiments and/or of the computer program (product) according to the embodiments and/or of the data carrier signal according to the embodiments for at least one of: a) enabling mobility, particularly L1/L2 centric mobility, b) preparing handovers by using L1 and/or L2 signaling, c) triggering handovers by using L1 and/or L2 signaling, d) triggering beam measurement(s) of at least one non-serving cell by using L1 and/or L2 signaling.

BRIEF DESCRIPTION OF THE FIGURES

Some exemplary embodiments will now be described with reference to the accompanying drawings in which.

DESCRIPTION OF THE EMBODIMENTS

Figure 1:
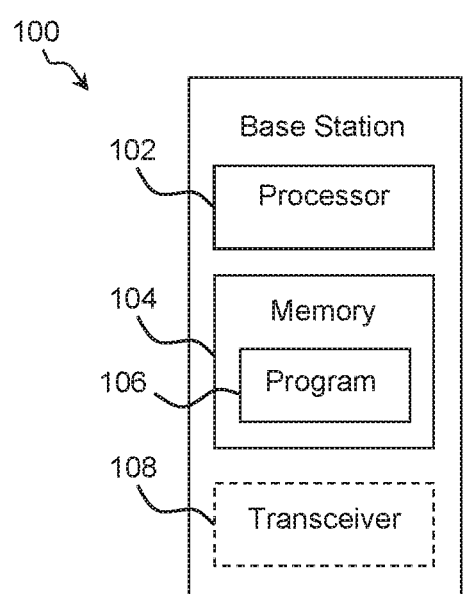
FIG. 1 schematically depicts a simplified block diagram of a base station according to exemplary embodiments, FIG. 2 schematically depicts a simplified block diagram of a user equipment according to further exemplary embodiments, FIG. 3 schematically depicts a simplified block diagram of a system according to further exemplary embodiments, FIG. 4 schematically depicts a simplified flow-chart according to further exemplary embodiments, FIG. 5 schematically depicts a simplified flow-chart according to further exemplary embodiments, FIG. 6 schematically depicts signaling information according to further exemplary embodiments, FIG. 7, 8, 9, 10 each schematically depict a simplified flow-chart according to further exemplary embodiments, FIG. 11A, 11B, 11C each schematically depict a simplified diagram according to further exemplary embodiments, FIG. 12 schematically depicts a simplified flow-chart according to further exemplary embodiments, FIGS. 13 to 16 each schematically depict exemplary MAC CEs according to further exemplary embodiments, and FIGS. 17 to 19 each schematically depict exemplary information elements comprising a PCI field according to further exemplary embodiments.

FIG. 1 schematically depicts a simplified block diagram of a base station 100 according to exemplary embodiments. The base station 100 comprises at least one processor 102, and memory 104 storing instructions, e.g. in the form of computer program code 106. Optionally, according to further exemplary embodiments, the base station 100 may comprise a transceiver 108 for exchanging, i.e. transmitting and/or receiving, radio frequency, RF, signals with other components such as e.g. user equipment, UE, 200, cf. e.g. FIG. 2, and/or further devices (not shown).

According to further exemplary embodiments, the base station 100 may comprise one or more additional interface(s) and/or corresponding circuitry (not shown) for interfacing with further network elements or network nodes of a communication system. According to further exemplary embodiments, such further network elements or network nodes may e.g. comprise at least one further base station 100' (cf. FIG. 3) and/or Access and Mobility Management Function (AMF).

According to further exemplary embodiments, the base station 100 (FIG. 1) may form part of a wireless, particularly cellular, communications systems such as of the 5G (fifth generation) type. Particularly, exemplary embodiments may e.g. be used for enhancing existing procedures of 5G Release 15, cf. e.g. 3GPP TR 21.915 V15.0.0 (2019-09), thus e.g. enhancing a conventional gNodeB. However, according to further exemplary embodiments, the principle according to the embodiments is not limited to application with conventional 5G systems, but may also be used within other wireless communications systems.

Figure 2:
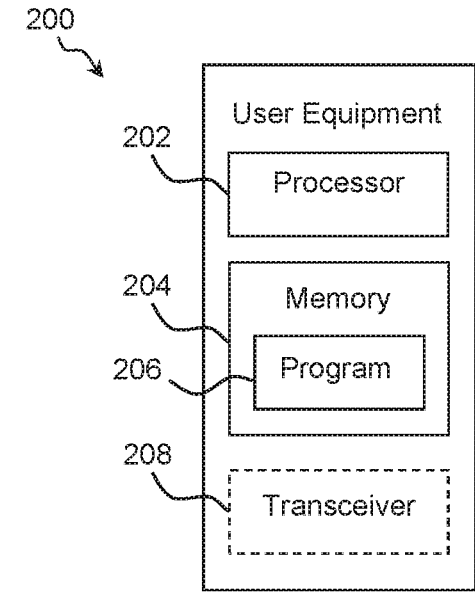
Figure 3:
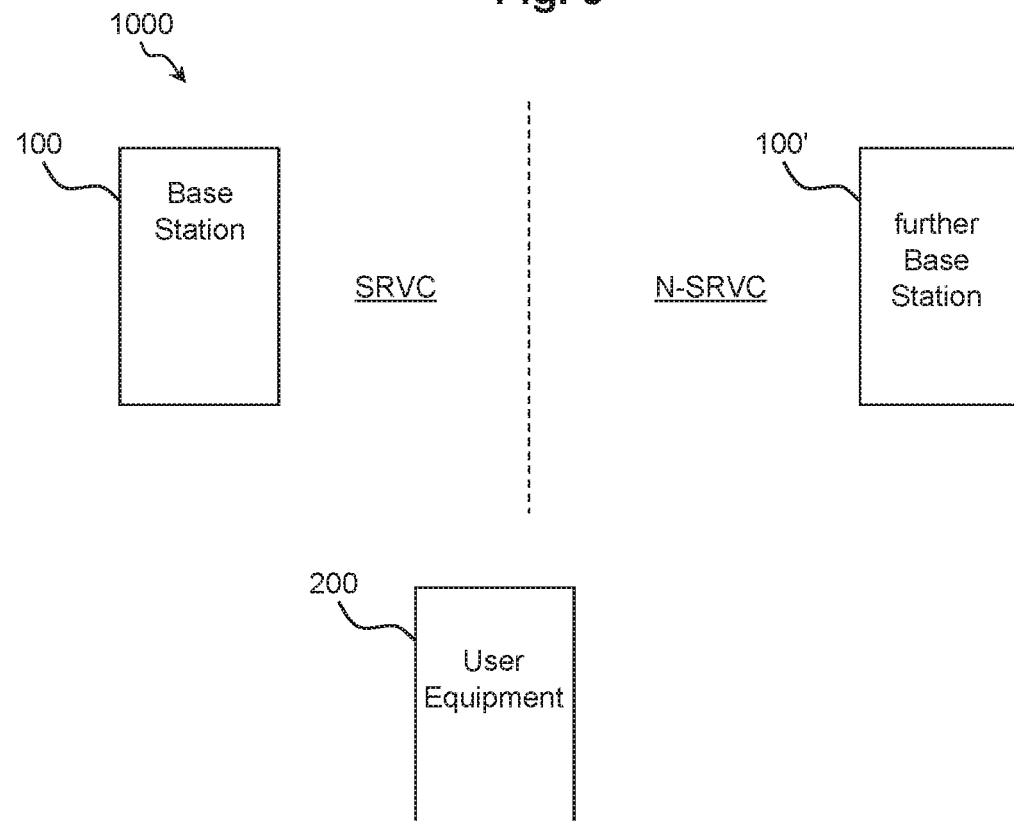

According to further exemplary embodiments, the base station 100 may e.g. form part of a wireless communications system 1000 as exemplarily depicted by FIG. 3. As an example, the system 1000 may comprise the base station 100 and at least one UE 200, details of which are explained further below with reference to FIG. 2, 8, 9, 10. According to further exemplary embodiments, the base station 100 may e.g. provide a serving cell SRVC currently serving e.g. the UE 200.

According to further exemplary embodiments, the system 1000 (FIG. 3) may also comprise at least one further base station 100'. According to further exemplary embodiments, the at least one further base station 100' may be a conventional base station or a (further) base station according to the embodiments. Presently, as an example, the further base station 100' provides a non-serving cell N-SRVC as seen from the perspective of the UE 200. In other words, the UE 200 is currently being served by the base station 100, which provides the serving cell SRVC, e.g. a primary cell (PCell).

According to further exemplary embodiments, the instructions 106 of the base station 100 (also cf. FIG. 1), when executed by the processor 102, cause the base station 100 at least to, cf. the simplified flow-chart of FIG. 4: configure 300 the UE 200 (cf. e.g. FIG. 3) with a bandwidth part BWP2 associated with a non-serving cell N-SRVC (FIG. 3), and with a reference signal RS-BWP2 associated with the bandwidth part BWP2 which the UE 200 can use to perform beam measurements BM related to the non-serving cell N-SRVC. This enables the UE 200 to determine information related to one or more beams of a currently non-serving cell N-SRVC, e.g. of a neighboring base station 100'. According to further exemplary embodiments, the information, i.e. in form of the beam measurements, may e.g. be used to prepare a handover procedure and/or to determine whether a handover procedure should be prepared.

According to further exemplary embodiments, the instructions, when executed by the at least one processor 102, further cause the base station 100 to activate 302 a transmission configuration indicator, TCI, state for PDCCH reception within the bandwidth part BWP2, wherein the activated TCI state comprises quasi-co-located, QCL, information associated with the reference signal RS-BWP2 or with a further reference signal.

According to further exemplary embodiments, cf. FIG. 4, the instructions, when executed by the at least one processor 102, further cause the base station 100 to receive 304 at least one measurement report REP from the UE 200 comprising information characterizing the beam measurements related to the non-serving cell N-SRVC.

According to further exemplary embodiments, the instructions, when executed by the at least one processor 102, further cause the base station 100 to instruct 306 the UE 200 via at least one of L1 signaling and L2 signaling CMD to switch to the non-serving cell N-SRVC, wherein instructing 306 the UE 200 to switch to the non-serving cell N-SRVC is preferably based on the measurement report REP. This enables to efficiently initiate and/or perform handover procedures using L1/L2 signaling, wherein exemplary embodiments enable to avoid RRC signaling.

According to further exemplary embodiments, physical layer (L1) signaling may be used for the instructing 306, e.g. using downlink control information, DCI.

According to further exemplary embodiments, medium access control (MAC) (L2) signaling may be used for the instructing 306, e.g. using at least one MAC control element, CE, (MAC CE). According to further exemplary embodiments, cf. FIG. 5, the instructions, when executed by the at least one processor 102, further cause the base station 100 to use 310 a medium access control, MAC, control element (MAC CE), for at least one of: a) activating 311 a or TCI state, b) triggering 312 (e.g., initiating) a handover of the UE 200 to the non-serving cell N-SRVC, c) providing 313 first signaling information SI1 (cf. FIG. 6) which indicates whether the UE 200 should interpret a TCI state activation as a trigger for a handover, d) triggering 314 the UE 200 to enter multi-transmission and reception point, multi-TRP, connectivity with its currently serving cell SRVC and the non-serving cell N-SRVC, e) triggering 315 multi-cell connectivity for a currently activated TCI state, f) triggering 316 both a TCI state activation and multi-cell connectivity.

While FIG. 5 exemplarily depicts the various optional steps 311, 312, 313, 314, 315, 316 in an exemplary vertical arrangement, each of the steps may, according to further exemplary embodiments, be performed alone, i.e. without performing any other one of the steps or in combination with one or more of the steps. Also, according to further exemplary embodiments, when performing several of the steps exemplarily depicted by FIG. 5, other sequence(s) of the steps are also possible, as well as an at least quasi-simultaneous (e.g., temporally overlapping and/or using a same signalling mechanism such as e.g. a same MAC CE) execution of several of these steps.

FIG. 6 schematically depicts signaling information according to further exemplary embodiments. As an example, the first signaling information SI1 exemplarily mentioned above with reference to optional step 313 of FIG. 5 may be embedded or comprised within a MAC CE MCE as exemplarily depicted by FIG. 6.

Figure 13:
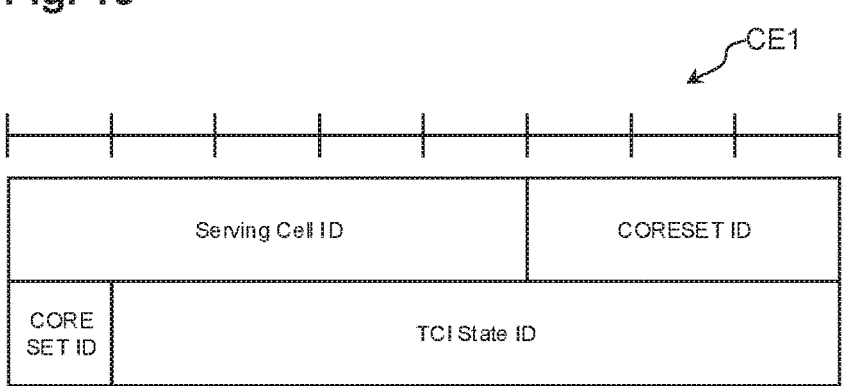
Figure 14:
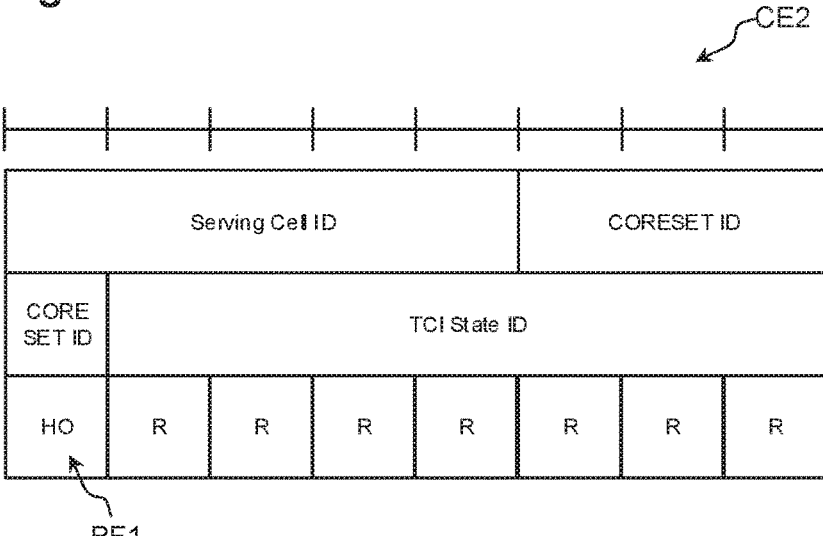
Figures 15, 16:
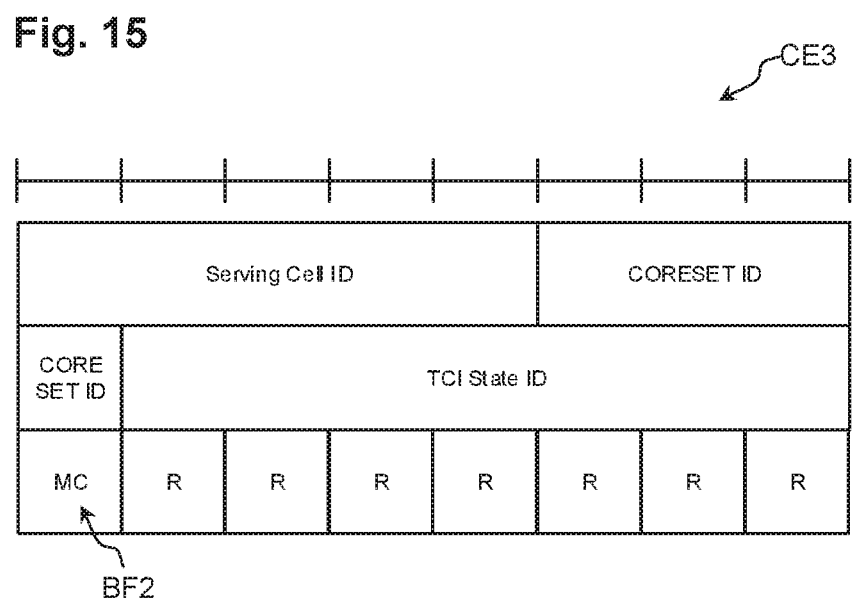

According to further exemplary embodiments, an existing MAC CE CE1, e.g. a MAC CE for TCI state activation for PDCCH for a CORESET, as e.g. defined by 3GPP 38.321 V15.8.0 (2019-12), FIG. 6.1.3.15-1, and as exemplarily depicted by FIG. 13 may be enhanced by adding a data field, e.g. bit field, for accommodating the first signaling information SI1 which may e.g. be used for the above explained step 313. This is exemplarily depicted by FIG. 14, which shows an enhanced MAC CE CE2 having an additional bit field BF1 for indicating a handover trigger ("HO"), and by FIG. 15, which shows an enhanced MAC CE CE3 having an additional bit field BF2 for indicating or triggering inter-cell multi-connectivity ("MC"). FIG. 16 exemplarily depicts a MAC CE CE4 for triggering HO using an indication of bandwidth part identifier ("BWP ID") according to further exemplary embodiments.

According to further exemplary embodiments, the bandwidth part BWP2 (FIG. 4) associated with the non-serving cell N-SRVC (FIG. 3) comprises: at least one downlink bandwidth part of the non-serving cell N-SRVC and/or at least one uplink bandwidth part of the non-serving cell N-SRVC.

According to further exemplary embodiments, the instructions, when executed by the at least one processor 102, further cause the base station 100, cf. FIG. 7, to configure 322 the UE 200 with an uplink bandwidth part for the non-serving cell N-SRVC that includes a beam failure recovery configuration.

According to further exemplary embodiments, the instructions, when executed by the at least one processor 102, further cause the base station 100 to configure 324 the non-serving cell N-SRVC by means of RRC configuration information as a potential target cell prior to triggering a L1- and/or L2-based handover from the UE.

According to further exemplary embodiments, an existing RRC signaling message may be extended by adding the information field indicating that the non-serving cell N-SRVC is a potential handover target cell for a L1- and/or L2- triggered handover.

FIG. 17, 18, 19 each schematically depict exemplary information elements comprising a PCI field according to further exemplary embodiments.

FIG. 17 schematically depicts a part IE1 of a "ServingCellConfig" information element (enhanced with respect to the conventional IE as provided by 3GPP 38.331), wherein an optional PCI field is added, as can be seen from the dashed rectangle R1.

FIG. 18 schematically depicts a "BWP-Downlink" information element 1E2 (enhanced with respect to the conventional IE as provided by 3GPP 38.331), wherein an optional PCI field is added, as can be seen from the dashed rectangle R2. According to further exemplary embodiments, the IE BWP-Downlink may be used to configure an additional downlink bandwidth part (e.g., not for the initial BWP).

FIG. 19 schematically depicts a "BWP-DownlinkDedicated" information element 1E3 (enhanced with respect to the conventional IE as provided by 3GPP 38.331), wherein an optional PCI field is added, as can be seen from the dashed rectangle R3.

According to further exemplary embodiments, any of said exemplarily added PCI fields R1, R2, R3 of FIG. 17, 18, 19 may be used to indicate to the UE 200 that the related bandwidth part configuration is related to a non-serving cell. According to further exemplary embodiments, the instructions, when executed by the at least one processor 102, further cause the base station 100 to preconfigure 326 the UE 200 by means of RRC configuration information associated with the non-serving cell prior to triggering a L1- and/or L2-based handover for the UE 200.

While FIG. 7 exemplary depicts a sequence of the various optional steps 322, 324, 326, each of the steps may, according to further exemplary embodiments, be performed alone, i.e. without performing any other one of the steps or in combination with one or more of the steps. Also, according to further exemplary embodiments, when performing several of the steps exemplarily depicted by FIG. 7, other sequence(s) of the steps are also possible, as well as an at least quasi-simultaneous execution of several of these steps.

According to further exemplary embodiments, a functionality of the base station 100 (FIG. 1, 3) may be implemented within, i.e. distributed over, different physical entities or devices (not shown), respectively. As an example, according to further exemplary embodiments, a first device may e.g. configure (cf. step 300 of FIG. 4) a UE 200 with the bandwidth part BWP2 associated with a non-serving cell N-SRVC, whereas a second device may e.g. activate (cf. step 302 of FIG. 4) a TCI state.

Further exemplary embodiments relate to a UE 200, cf. e.g. FIG. 2, the UE 200 comprising at least one processor 202, and memory 204 storing instructions, e.g. in the form of computer program code 206.

Optionally, according to further exemplary embodiments, the UE 200 may comprise a transceiver 208 for exchanging, i.e. transmitting and/or receiving, radio frequency, RF, signals with other components such as e.g. one or more of the base stations 100, 100' (FIG. 3), and/or further devices (not shown).

According to further exemplary embodiments, the UE 200 may e.g. be used for wireless, particularly cellular, communications systems such as of the 5G (fifth generation) type. Particularly, exemplary embodiments may e.g. be used for enhancing existing procedures of 5G Release 15, cf. e.g. 3GPP TR 21.915 V15.0.0 (2019-09), but these exemplary embodiments are not limited thereto.

According to further exemplary embodiments, the instructions 206, when executed by the at least one processor 202, further cause the UE 200 to: receive 330 configuration information CI related to a bandwidth part BWP2 associated with a non-serving cell N-SRVC, and to a reference signal associated with the bandwidth part BWP2, and to perform 332 beam measurements BM related to the non-serving cell N-SRVC by means of the reference signal.

According to further exemplary embodiments, the instructions, when executed by the at least one processor 202, further cause the UE 200 to activate 333 a transmission configuration indicator, TCI, state for PDCCH reception within the bandwidth part BWP2, wherein the activated TCI state comprises quasi-co-located, QCL, information associated with the reference signal or with a further reference signal.

According to further exemplary embodiments, cf. FIG. 2 and FIG. 9, the instructions, when executed by the at least one processor 202, further cause the UE 200 to send 335 a measurement report REP comprising information characterizing the beam measurements BM related to the non-serving cell to a base station 100 operating a currently serving cell SRVC (FIG. 3).

According to further exemplary embodiments, cf. FIG. 10, the instructions, when executed by the at least one processor 202, further cause the UE 200 to receive 340 a command CMD instructing (cf. step 306 of FIG. 4) the UE 200 to switch to the non-serving cell N-SRVC via at least one of L1 signaling (e.g., DCI or the like) or L2 signaling (e.g., at least one MAC CE), and to switch 342 to the non-serving cell N-SRVC in response to the command CMD.

According to further exemplary embodiments, the instructions, when executed by the at least one processor 202, further cause the UE 200 to determine that the bandwidth part BWP2 is associated with the non-serving cell N-SRVC based on a physical cell ID, PCI, field included in the configuration information CI. In other words, according to further exemplary embodiments, if the PCI field is present in the configuration CI (and/or an RRC information element used for the configuration of the UE 200), the UE 200 may interpret the related bandwidth part configuration as a configuration related to a or the non-serving cell N-SRVC. According to further exemplary embodiments, in these cases, only specific functions may be activated at or performed by the UE 200. As an example, if the UE 200 interprets the related bandwidth part configuration as a configuration related to a non-serving cell N-SRVC, it may not monitor a physical downlink control channel, PDCCH, but rather (for example only) perform beam measurements BM and/or reporting, particularly according to the configuration.

According to further exemplary embodiments, a network side entity, e.g. the base station 200, may active TCI states and/or update a TCI state list for the respective bandwidth part.

According to further exemplary embodiments, the configuration information CI are related to an uplink bandwidth part associated with the non-serving cell N-SRVC and include a beam failure recovery configuration.

Figure 12:
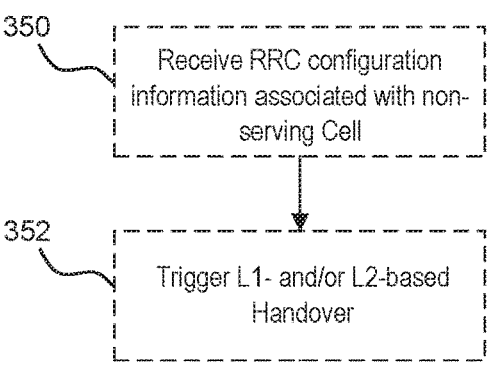

According to further exemplary embodiments, cf. FIG. 12, the instructions, when executed by the at least one processor 202, further cause the UE 200 to receive 350 RRC configuration information associated with the non-serving cell (N-SRVC) prior to triggering 352 a L1- and/or L2-based handover for the UE 200.

Further exemplary embodiments relate to a system 1000 (FIG. 3) comprising at least one base station 100 according to the embodiments and at least one UE 200 according to the embodiments.

According to further exemplary embodiments, and as already exemplarily mentioned above, the system 1000 may comprise one or more further base stations 100' and/or one or more further UE (not shown). According to further exemplary embodiments, the at least one further base station 100' may be a conventional base station or a (further) base station according to the embodiments, i.e. similar or identical to the base station 100 of FIG. 1). Similarly, according to further exemplary embodiments, the at least one further UE may be a conventional UE or a (further) UE according to the embodiments.

Further exemplary embodiments, cf. e.g. FIG. 4, relate to a method of operating a base station 100, e.g. a gNodeB, comprising: configuring 300 a UE 200 with a bandwidth part BWP2 associated with a non-serving cell N-SRVC, and with a reference signal RS-BWP2 associated with the bandwidth part BWP2 which the UE 200 can use to perform beam measurements BM related to the non-serving cell N-SRVC. Further exemplary embodiments relate to a method of operating a base station 100, e.g. a gNodeB, according to one or more of the exemplary embodiments explained above with reference to FIGS. 4 to 10.

Further exemplary embodiments, cf. e.g. FIG. 8, relate to a method of operating a UE 200, comprising: receiving 330 configuration information CI related to a bandwidth part BWP2 associated with a non-serving cell N-SRVC, and to a reference signal RS-BWP2 associated with the bandwidth part BWP2, and performing 332 beam measurements BM related to the non-serving cell N-SRVC by means of the reference signal RS-BWP2. Further exemplary embodiments relate to a method of operating a UE 200 according to one or more of the exemplary embodiments explained above with reference to FIGS. 4 to 10.

Further exemplary embodiments relate to a computer program (cf. e.g. the computer program code 106 of FIG. 1 and/or the computer program code 206 of FIG. 2) and/or a computer program product comprising instructions which, when the program is executed by a computer (cf. e.g. processor 102 of FIG. 1 and/or the processor 202 of FIG. 2), cause the computer to carry out the method according to the embodiments.

Further exemplary embodiments relate to a data carrier signal carrying and/or characterizing the computer program according to the embodiments.

Further exemplary embodiments relate to a use of the base station 100 according to the embodiments and/or of the UE 200 according to the embodiments and/or of the method according to the embodiments and/or of the system 1000 according to the embodiments and/or of the computer program (product) 106, 206 according to the embodiments and/or of the data carrier signal according to the embodiments for at least one of: a) enabling mobility, particularly L1/L2 centric mobility, b) preparing handovers by using L1 and/or L2 signaling, c) triggering handovers by using L1 and/or L2 signaling, d) triggering beam measurement(s) of at least one non-serving cell by using L1 and/or L2 signaling.

In the following, further aspects, advantages and exemplary embodiments are provided which—either in combination with each other or alone—may be combined with at least one of the exemplary embodiments explained above.

Figure 11A:
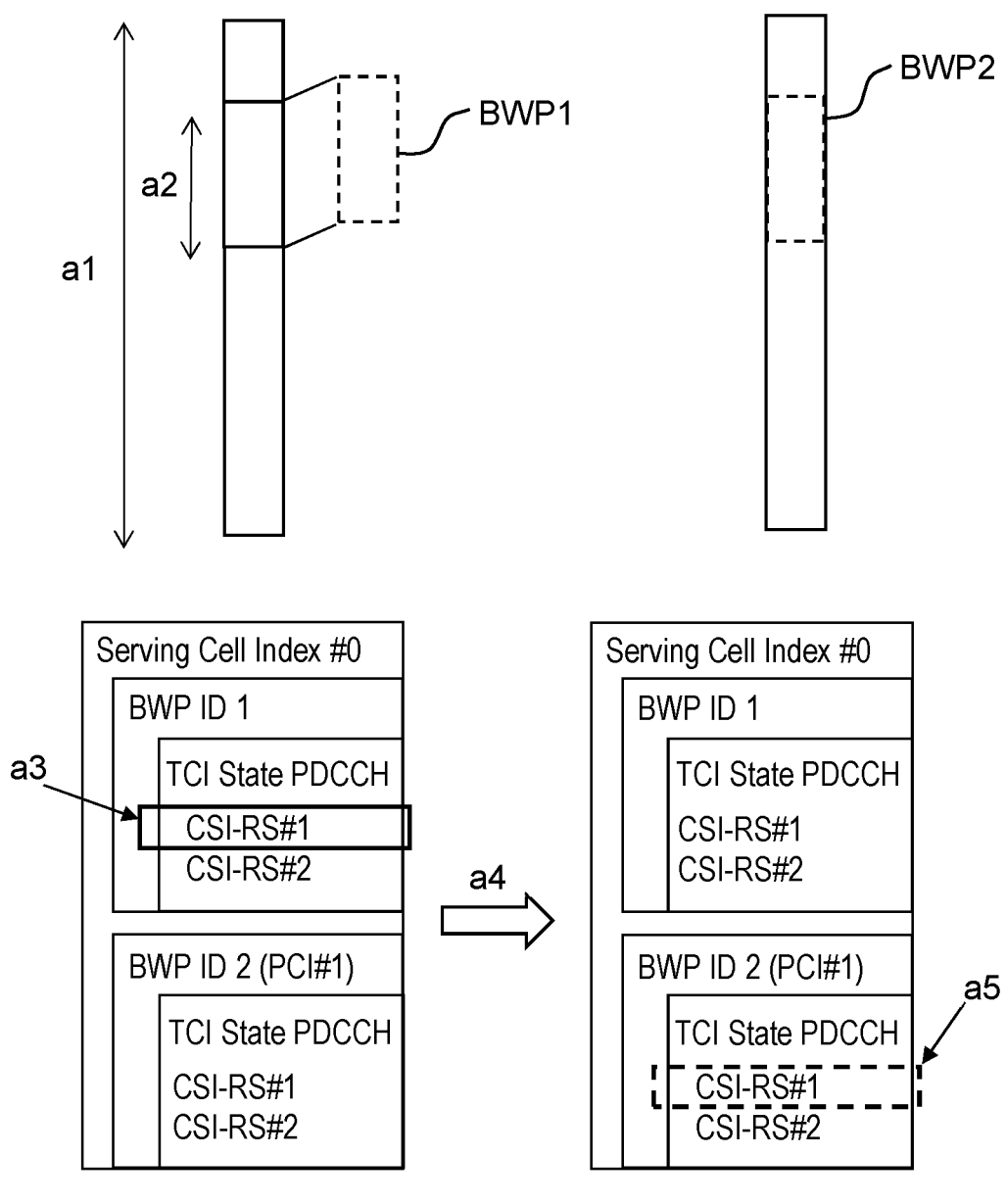

FIG. 11A schematically depicts a simplified diagram showing an overall carrier bandwidth of a currently serving cell ("Serving Cell Index #0") symbolized by double arrow a1, and a first bandwidth part BWP1 thereof is indicated with double arrow a2. Arrow a3 indicates a currently active TCI state for PDCCH, i.e. being associated with the first bandwidth part BWP1 ("BWP ID 1"). By using Ll and/or L2 signaling, cf. block arrow a4, another TCI state may be activated, e.g. by the base station 100 (FIG. 1), which e.g. enables the UE 200 to perform beam measurement(s) BM related to the at least one bandwidth part BWP2 ("BWP ID 2") associated with a currently non-serving cell ("PCI#1"), also cf. arrow a5 of FIG. 11A and the dashed rectangle pointing out CSI-RS#1 of BWP ID 2. The configuration of FIG. 11A may according to further exemplary embodiments also be denoted as "non-serving cell configuration as semi-active BWP on PCell".

Figure 11B:
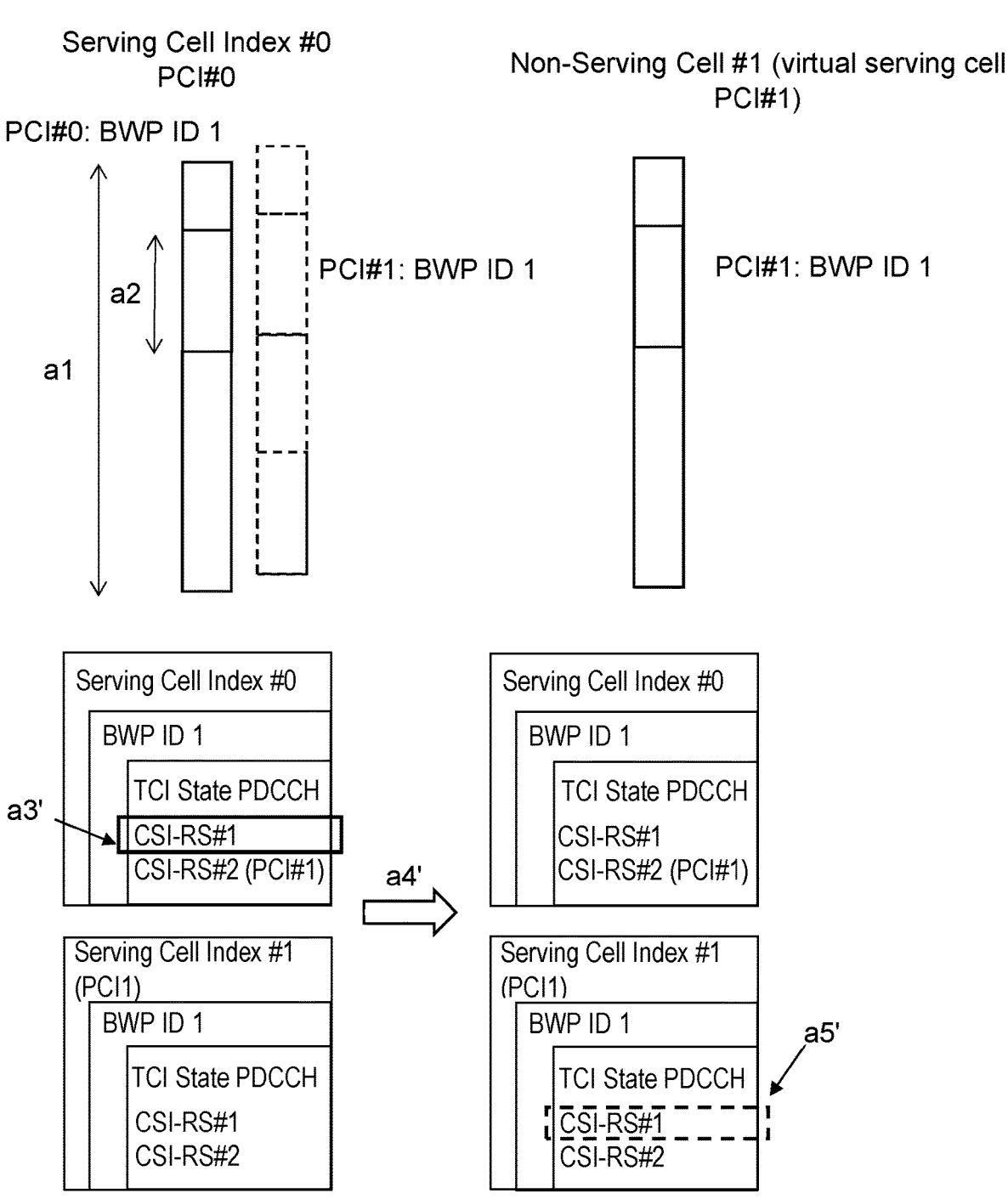

FIG. 11B schematically depicts a simplified diagram according to further exemplary embodiments, wherein a currently non-serving cell (also cf. N-SERVC of FIG. 3) may be used as a PCell candidate, configured as a temporary SCell. Arrow a3' denotes a currently active TCI state for PDCCH. Similar to FIG. 11A, block arrow a4' indicates activation of another TCI state a5', e.g. via the base station 100 (FIG. 3) using Ll and/or L2 signaling such as a MAC CE, the another TCI state a5' being associated with BWP ID 1 of non-serving cell #1, thus enabling the UE 200 to perform beam measurement(s) BM related to the non-serving cell.

Figure 11C:
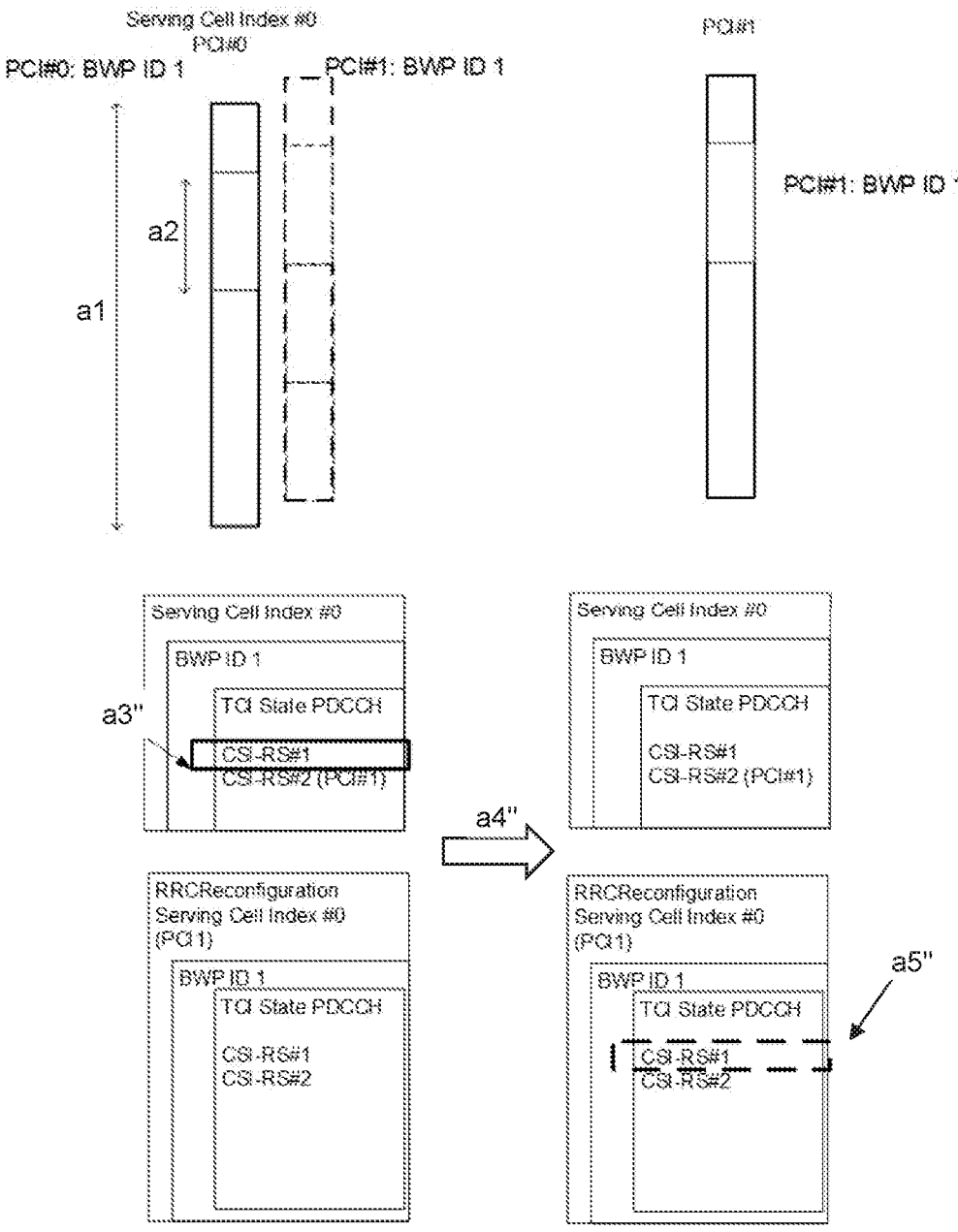

FIG. 11C schematically depicts a simplified diagram according to further exemplary embodiments, wherein a non-serving cell may be considered as RRC configured candidate, preferably with specific functions active such as beam measurement(s) and/or reporting. Arrow a3" of FIG. 11C denotes a currently active TCI state for PDCCH associated with BWP ID 1. Similar to elements 4a, 4a' of FIG. 11A, 11B, respectively, block arrow a4" of FIG. 11C indicates activation of another TCI state a5", e.g. via the base station 100 (FIG. 3) using L1 and/or L2 signaling such as a MAC CE, the another TCI state a5" enabling the UE 200 to perform beam measurement(s) BM related to the non-serving cell.

According to further exemplary embodiments, when a bandwidth part BWP2 associated with a non-serving cell N-SRVC (FIG. 3) is configured for a serving cell SRVC, the UE 200 may determine that the bandwidth part BWP2 is not active, i.e. in a similar manner as a currently active bandwidth part BWP for the serving cell (PCell). According to further exemplary embodiments, particularly upon such determination, the UE 200 would not monitor a PDCCH on the given bandwidth part BWP2 associated with the non-serving cell N-SRVC.

According to further exemplary embodiments, specific functions or a subset of a bandwidth part related functionality that may be considered active (thus e.g. being performed by the UE 200) may be configured by the network, e.g. the base station 100.

According to further exemplary embodiments, the network, e.g. base station 100, may manage (i.e. activate and/or deactivate) TCI states for a downlink bandwidth part, for example for both PDCCH and PDSCH, preferably using at least one MAC CE.

According to further exemplary embodiments, when the network, e.g. base station 100, activates, via L1 and/or L2 signaling, a TCI state for PDCCH for a bandwidth part BWP2 associated with a non-serving cell (or when the base station 100 indicates that activation and handover is triggered), the UE 200 may interpret the L1 and/or L2 signaling as a command to perform a handover (HO).

According to further exemplary embodiments, prior to a HO, the bandwidth part BWP2 associated with a non-serving cell may be considered to be "semi-" active, i.e. a serving cell (PCell) or base station 100 may have a currently active BWP BWP1 (cf. e.g. FIG. 11A) and additionally, preferably simultaneously, one or more semi-active BWPs BWP2 ("BWP ID 2") for which the UE 200 may e.g. apply beam measurement BM (also cf. step 332 of FIG. 8) and/or reporting REP, but not, for example monitoring of PDCCH.

According to further exemplary embodiments, based on a MAC indication of changing active TCI state (cf. e.g. command CMD of step 332 of FIG. 8), also the active BWP may be changed to a certain BWP. According to further exemplary embodiments, where the certain BWP configuration would be a BWP in a (currently non-serving) target cell, the activation of the TCI state may also be used to, particularly implicitly, signal HO.

According to further exemplary embodiments, a PCell may be changed later and/or separately. In one example, upon receiving L1/L2 signaling to trigger handover according to the exemplary embodiments explained herein, it may cause the UE 200 to transmit "handover complete" (e.g. RRCReconfiguration complete) to (handover) target PCell (the one that the BWP or the was associated). According to further exemplary embodiments, prior to the transmission, the UE 200 may apply the provided pre-configuration (such as RRCReconfiguration or other configuration partly or fully).

According to further exemplary embodiments, alternatively, in case the BWP is configured for the UE 200 using the preconfiguration as exemplarily described herein, the UE 200 may apply the BWP configuration (e.g., at least one of DL or UL BWP configuration provided in the RRC preconfiguration such as RRCReconfiguration) and may conduct communication with a target cell (the previous non-serving cell N-SRVC or in case a multi-TRP a cell that UE was conducting inter-cell communication) using the BWP configuration. According to further exemplary embodiments, once the UE 200 is in communication with the target cell, the target cell may provide the UE 200 with new RRCReconfiguration or it may provide the UE 200 with additional RRC configuration parameters, e.g. in addition to the current BWP configuration. In other words, in some example cases, the UE 200 may retain a preconfigured BWP configuration once it performs successfully the HO to a target cell.

According to further exemplary embodiments, a further configuration of the target cell N-SRVC (FIG. 3), as can e.g. be characterized by RRC changes, e.g. including a (potential) cell radio network temporary identifier (C-RNTI), may be updated later, preferably in the target cell, e.g. in case physical layer connection is established using the MAC CE activation.

According to further exemplary embodiments, a bandwidth part may be associated with a specific PCI or other cell identifier that e.g. identifies that the UL/DL bandwidth part is configured for lower layer (L1/L2) mobility purposes.

In one further example embodiment, the BWP may be associated as non-serving cell BWP based on any of the sub information elements (IE) or configuration within the BWP configuration e.g.

PDCCH-config, CORESET, search space, downlink reference signals uplink reference signals. According to further exemplary embodiments, these IEs may contain information to identify a non-serving cell and in one example the information may be e.g. PCI. In case of reference signals, the PCI may be included as part of the reference signal configuration e.g. part of the SS-PBCH/SSB block index/CSI-RS index which associated the signal to specific cell. According to further exemplary embodiments, alternatively, the association may be provided as part of the TCI state configuration and the PCI may be included as part of the QCL source configuration for a specific reference signal.

According to further exemplary embodiments, as an example, the UE 200 may be configured with NZP-CSI-RS (non-zero-power CSI-RS, target signal) and in the configuration a source signal, QCL source is provided for the said signal. The QCL assumption between source and target signal or between first signal and second signal indicates to UE 200 that the signal share the same characteristics such as delay spread, Doppler, spatial RX (spatial RX, or QCL-TypeD, tells UE 200 that it may use same RX beam for receiving the signals). The QCL source signal may thus indicate or include identifier for the non-serving cell (e.g. PCI) which can be understood by UE 200 that the reference signal source and the target are transmitted by specific cell. In one example, the QCL source may be from another BWP or from another serving cell or non-serving cell. According to further exemplary embodiments, the reference signals may be configured for beam measurement and reporting purposes and/or entries in the TCI state list (which may be BWP specific).

According to further exemplary embodiments, a non-serving cell N-SRVC (FIG. 3) may be configured for lower layer (L1/L2) mobility purposes. As an example, the non-serving cell N-SRVC may be configured for a UE 200 as a serving-cell using a RRC serving cell config as follows:—an additional field (e.g., bit field) may be added to the (conventional) serving cell config, the additional field indicating that a neighbor cell (i.e., currently non-serving cell) is configured as a serving cell for the UE 200, but the configured neighbour cell is considered as a cell for L1/L2 mobility. According to further exemplary embodiments, such neighbour cell may be denoted as "temporary serving cell" and/or "TSC".

According to further exemplary embodiments, a non-serving cell may be assigned a serving cell index, e.g. via configuration, so that the non-serving cell would look like, from a configuration point for the UE 200, as a "configured SCell", that can e.g. be referred with logical serving cell index in the signaling, e.g. RRC-based signaling and/or MAC CE signaling or the like. According to further exemplary embodiments, the UE 200 knows due to an additional field in the serving cell config that the non-serving cell/neighbour cell is not configured as (conventional) SCell for the same cell group as PCell, but as a cell for L1/L2 mobility according to exemplary embodiments.

According to further exemplary embodiments, the serving cell index may be reserved starting from a highest serving cell index space. According to further exemplary embodiments, the network or base station 100 may configure the UE 200 to ignore specific serving cell index values, e.g. when performing SCell-related signaling that refers to serving cell index: e.g., the UE 200 may be configured with a PCell (serving cell index 0) and with one SCell (serving cell index #1), and the non-serving cell for L1/L2 mobility is configured with serving cell index #2, wherein the SCell with index #2 does not exist.

In one example, the L1/L2 mobility or L1/L2 centric mobility may be referred in various ways e.g. as inter-cell beam mobility, beam mobility, lower layer mobility, non-RRC level mobility, beam management based mobility or the like.

According to further exemplary embodiments, when the UE 200 performs an RRC level HO to a (previously non-serving) neighbour cell N-SRVC, the UE 200 may remove a temporary serving cell configuration or switch a configuration to be the current serving cell (index #0).

According to further exemplary embodiments, the UE 200 may be configured with a TCI state list for one of the bandwidth parts in the PCell (e.g. BWP ID#1), and the TCI state list information element (IE) may include a field for a PCI (Physical Cell ID) or other indication that the TCI state list is for the non-serving cell N-SRVC. In one example, the UE 200 may determine the non-serving cell configuration based on the configuration of the reference signals in the list as described herein.

According to further exemplary embodiments, the network or base station 100, can, preferably in similar manner, activate TCI states for PDCCH and/or PDSCH, e.g. with or without triggering HO.

In one example, the UE 200 may be configured with one or more CORESETs for a BWP, and network (i.e., base station 100) may activate TCI states for PDCCH for one or more CORESETs. In one example, network may activate one or more TCI states for PDCCH for one or more CORESETs which may not cause UE 200 to switch to new cell until it is explicitly given a HO command (e.g. using L1/L2 signaling). In another example, UE 200 may have one or more CORESETS, and when at least one TCI state is activated for at least one CORESET, the UE 200 may interpret it as HO command. In one example, also RRC level signaling may be used to trigger HO and causing the UE 200 to maintain the current TCI state activation when successfully connecting to target cell. According to further exemplary embodiments, a new MAC CE may be used to differentiate signaling between a TCI state list of a serving cell bandwidth part and a non-serving cell.

According to further exemplary embodiments, a RRC-based reconfiguration, i.e. based on the RRCreconfiguration message, may be used, e.g. for conditional handover (CHO) purposes and/or, preferably similarly as CHO, for a candidate configuration where the UE 200 is not immediately triggered for HO to another cell, may be preconfigured using RRC signalling with a candidate cell. In some examples, specific configurations may be activated or associated for the said configured candidate cell such as beam measurements/reporting and L1/L2 signaling may be used to trigger handover as described in the various example embodiments herein.

According to further exemplary embodiments, a MAC CE signaling based activation of a TCI state for PDCCH for the preconfigured cell triggers at least one of: a) HO, b) pre-activation of a TCI state, c) multi-connectivity.

According to further exemplary embodiments, specific, preferably predetermined, functions may be active at the UE 200, e.g. beam measurements BM and reporting, e.g. the UE

200 may have an active BWP or semi-active BWP. According to further exemplary embodiments, the UE 200 may apply only specific parts of the BWP configuration for L1/L2 mobility purposes according to preferred embodiments.

According to further exemplary embodiments, in any of the above embodiments and/or options, only specific functions of the BWP configuration of the non-serving cell BWP to serving cell may be active or considered as valid for L1/L2 mobility: E.g. CSI-RS resource configuration, CSI-RS/SSB resource list (measurement configuration), beam reporting configurations for SSB and/or CSI-RS, CSI-reporting wherein at least L1-RSRP reporting may be active (and/or can be configured by network i.e. UE 200 may activate also CQI and/or RANK and/or other reporting).

According to further exemplary embodiments, if the UE 200 has been configured with active TCI state for PDCCH for a (currently non-serving) neighbour cell and the current cell experiences radio link failure (RLF)/beam failure, it may prioritize the SSB in the RACH resource selection that corresponds to the source RS for the at least one of the TCI state or states activated for the PDCCH. According to further exemplary embodiments, a similar procedure may be applied with a contention-free random access (CFRA) configuration.

According to further exemplary embodiments, if the UE 200 has been provided with a RRCreconfiguration message, e.g. for pre-configuration, after determining that the lower layer HO or L1/L2 mobility or BWP switch for HO purposes is triggered, it may transmit an RRCReconfigurationComplete message to the target base station 100' (FIG. 3), i.e. target gNB.

At least some of the above-explained exemplary embodiments may at least temporarily have at least one of the following advantages: a) the network or base station 100 can pre-configure TCI states for the UE 200 as pre-configuration and may trigger HO later on, e.g. by using L1 and/or L2 signaling, e.g. a MAC CE, or the HO can implicitly be triggered, b) a BWP configuration may be more flexible across the cells 100' that are the "L1/L2 mobility candidates", i.e. potential target cells for a L1/L2-based handover according to exemplary embodiments, c) in a failure case, the UE 200 may already be configured with a TCI state for a target cell 100', d) the network or base station 100 may refer to a specific serving cell index when configuring the beam reporting configurations for the UE 200 using current RRC signaling.

The invention claimed is:

1. A base station comprising:
   at least one processor, and
   at least one non-transitory memory storing instructions that, when executed with the at least one processor, cause the base station at least to:
      configure a user equipment with a bandwidth part associated with a non-serving cell, and with a reference signal associated with the bandwidth part,
      receive, from the user equipment, a measurement report comprising information characterizing beam measurements related to the non-serving cell, and
      send, to the user equipment, a medium access control (MAC) control element (CE) for both triggering a layer 1 (L1) and/or a layer 2 (L2) based handover of the user equipment to the non-serving cell, and activating a transmission configuration indicator state for physical downlink control channel and/or physical downlink shared channel reception within the bandwidth part, wherein the activated transmission configuration indicator state comprises quasi-co-located information associated with the reference signal.

2. The base station according to claim 1, wherein triggering the L1 and/or L2 based handover of the user equipment to the non-serving cell is based on the measurement report.

3. The base station according to claim 1, wherein the instructions, when executed by the at least one processor, further cause the base station to use the MAC CE for at least one of:
   providing first signalling information which indicates whether the user equipment should interpret a transmission configuration indicator state activation as a trigger for a handover,
   triggering the user equipment to enter multi-transmission and reception point connectivity with its currently serving cell and the non-serving cell,
   triggering multi-cell connectivity for a currently activated transmission configuration indicator state, or
   triggering both a transmission configuration indicator state activation and multi-cell connectivity.

4. The base station according to claim 1, wherein the instructions, when executed by the at least one processor, further cause the base station to configure the user equipment with an uplink bandwidth part for the non-serving cell that includes a beam failure recovery configuration.

5. The base station according to claim 1, wherein the instructions, when executed by the at least one processor, further cause the base station to configure the non-serving cell with radio resource control configuration information as a potential target cell prior to triggering the L1- and/or L2-based handover for the user equipment.

6. The base station according to claim 1, wherein the instructions, when executed by the at least one processor, further cause the base station to preconfigure the user equipment with radio resource control configuration information associated with the non-serving cell prior to triggering the L1- and/or L2-based handover for the user equipment.

7. A user equipment comprising:
   at least one processor, and
   at least one non-transitory memory storing instructions that, when executed by the at least one processor, cause the user equipment at least to:
      receive configuration information related to a bandwidth part associated with a non-serving cell and to a reference signal associated with the bandwidth part,
      send a measurement report comprising information characterizing beam measurements related to the non-serving cell to a base station operating a currently serving cell,
      receive a medium access control (MAC) control element (CE) for both triggering a layer 1 (L1) and/or layer 2 (L2) based handover of the user equipment to the non-serving cell, and activating a transmission configuration indicator state for physical downlink control channel and/or physical downlink shared channel reception within the bandwidth part, wherein the activated transmission configuration indicator state comprises quasi-co-located information associated with the reference signal, and
      switch to the non-serving cell and activate the transmission configuration indicator state responsive to receiving the MAC CE.

8. The user equipment according to claim 7, wherein the instructions, when executed by the at least one processor, further cause the user equipment to determine that the bandwidth part is associated with the non-serving cell based on a physical cell ID field included in the configuration information.

9. The user equipment according to claim 7, wherein the configuration information are related to an uplink bandwidth part associated with the non-serving cell and include a beam failure recovery configuration.

10. The user equipment according to claim 7, wherein the instructions, when executed by the at least one processor, further cause the user equipment to receive radio resource control configuration information associated with the non-serving cell prior to triggering the L1- and/or L2-based handover for the user equipment.

11. A method comprising, by a user equipment:

receiving configuration information related to a bandwidth part associated with a non-serving cell and to a reference signal associated with the bandwidth part, sending a measurement report comprising information characterizing beam measurements related to the non-serving cell to a base station operating a currently serving cell, receiving a medium access control (MAC) control element (CE) for both triggering a layer 1 (L1) and/or layer 2 (L2) based handover of the user equipment to the non-serving cell, and activating a transmission configuration indicator state for physical downlink control channel and/or physical downlink shared channel reception within the bandwidth part, wherein the activated transmission configuration indicator state comprises quasi-co-located information associated with the reference signal, and switching to the non-serving cell and activating the transmission configuration indicator state responsive to receiving the MAC CE.

12. The method according to claim 11, further comprising determining that the bandwidth part is associated with the non-serving cell based on a physical cell ID field included in the configuration information.

13. The method according to claim 11, wherein the configuration information are related to an uplink bandwidth part associated with the non-serving cell and include a beam failure recovery configuration.

14. The method according to claim 11, further comprising receiving radio resource control configuration information associated with the non-serving cell prior to triggering the L1- and/or L2-based handover.

* * * * *